US007552460B2

(12) United States Patent
Goldman

(10) Patent No.: US 7,552,460 B2
(45) Date of Patent: Jun. 23, 2009

(54) MODIFYING AN ELECTRONIC PROGRAM GUIDE BASED ON VIEWER STATISTICS

(75) Inventor: Phillip Y. Goldman, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 1686 days.

(21) Appl. No.: 10/113,688

(22) Filed: Mar. 29, 2002

(65) Prior Publication Data

US 2002/0112239 A1 Aug. 15, 2002

Related U.S. Application Data

(63) Continuation-in-part of application No. 09/820,582, filed on Mar. 29, 2001.

(51) Int. Cl.
G06F 3/00 (2006.01)
G06F 13/00 (2006.01)
H04N 5/445 (2006.01)
H04N 7/16 (2006.01)
H04H 60/33 (2008.01)

(52) U.S. Cl. .................. 725/44; 725/40; 725/39; 725/38; 725/37; 725/9; 715/745; 715/721

(58) Field of Classification Search ............... 725/9, 725/47, 46, 16, 11, 14, 21
See application file for complete search history.

(56) References Cited

U.S. PATENT DOCUMENTS

| | | | |
|---|---|---|---|
| 5,592,470 A | 1/1997 | Rudrapatna | |
| 5,600,573 A * | 2/1997 | Hendricks et al. | 725/109 |
| 5,608,899 A | 3/1997 | Li | |
| 5,758,257 A | 5/1998 | Herz | |
| 5,805,203 A | 9/1998 | Horton | |
| 5,974,299 A | 10/1999 | Massetti | |

(Continued)

FOREIGN PATENT DOCUMENTS

JP 410248020 A 9/1998

(Continued)

OTHER PUBLICATIONS

U. S. Appl. No. 60/193,952 to Berezowski et al.*

(Continued)

*Primary Examiner*—Christopher Kelley
*Assistant Examiner*—Usha Raman
(74) *Attorney, Agent, or Firm*—Workman Nydegger

(57) ABSTRACT

Displaying the numbers of viewers who are watching currently-broadcasted television programs on electronic program guides (EPGs) using information gathered via back channels from home entertainment systems. A signal source transmits a television broadcast signal to televisions used by viewers. Processing devices associated with the televisions determine which program is being displayed and transmit this information to a central server using a back channel from the home entertainment system. Viewing behavior information is gathered from a large number of viewers and is compiled into a report that is transmitted to the individual processing devices of the home entertainment systems. Using the information included in the report, the processing devices modify the EPGs to visually display the number of viewers watching the various television programs. The modification can take the form of selected colors, sizes, or shapes of the EPG entries or icons or animation displayed with the EPG.

25 Claims, 6 Drawing Sheets

U.S. PATENT DOCUMENTS

| | | | |
|---|---|---|---|
| 6,154,463 | A | 11/2000 | Aggarwal |
| 6,312,336 | B1 | 11/2001 | Handelman |
| 6,704,931 | B1* | 3/2004 | Schaffer et al. ............... 725/46 |
| 6,718,552 | B1 | 4/2004 | Goode |
| 6,754,904 | B1 | 6/2004 | Cooper |
| 6,772,195 | B1 | 8/2004 | Hatlelid |
| 6,774,926 | B1 | 8/2004 | Ellis |
| 2001/0049620 | A1 | 12/2001 | Blasko |
| 2002/0053077 | A1 | 5/2002 | Shah-Nazaroff |
| 2002/0056087 | A1* | 5/2002 | Berezowski et al. ........... 725/9 |
| 2002/0095676 | A1 | 7/2002 | Knee |
| 2003/0056208 | A1 | 3/2003 | Kamada |
| 2003/0066074 | A1* | 4/2003 | Zimmerman et al. .......... 725/14 |
| 2003/0088872 | A1 | 5/2003 | Maissel |
| 2003/0115585 | A1 | 6/2003 | Barsness et al. ................ 725/9 |
| 2003/0145323 | A1 | 7/2003 | Hendricks |
| 2004/0049787 | A1* | 3/2004 | Maissel et al. ................ 725/46 |
| 2005/0071882 | A1* | 3/2005 | Rodriguez et al. ............ 725/95 |
| 2005/0149964 | A1 | 7/2005 | Thomas |
| 2005/0262542 | A1 | 11/2005 | DeWeese |
| 2007/0124795 | A1* | 5/2007 | McKissick et al. .......... 725/135 |

FOREIGN PATENT DOCUMENTS

| | | |
|---|---|---|
| WO | WO 99/45700 | 9/1999 |
| WO | WO 00/13416 | 3/2000 |
| WO | WO 00/27124 | 5/2000 |

OTHER PUBLICATIONS

Office Action mailed Oct. 5, 2007 cited in related U.S. Appl. No. 09/587,474.
NPL Reference—"Pie Chart" definition from Internet Archive of www.whatis.com (Sep. 2000).
Office Action mailed Nov. 16, 2007 cited in related U.S. Appl. No. 09/820,582.
R. Panabaker, S. Wegerif, and D. Zigmond, "The Transmission of IP Over the Vertical Blanking Interval of a Television Signal," (Feb. 1999).
Advanced Television Enhancement Forum Specification (ATVEF), Version 1.1 revision 26, (Feb. 2, 1999).
"How the Internet Works," Preston Gralla (1999), Chapter 20.
Electronic Industries Association EIA-746A, "Transport of Internet Uniform Resource Locator (URL) Information Using Text-2 (T-2) Service" (Sep. 1998).
S. Deering, "Host Extensions for IP Multicasting" (Aug. 1998).
J. Postel, "User Datagram Protocol," (Aug. 1980), identified as page ftp://ftp.isi.edu/innotes/rfc768.txt.
Office Action dated Mar. 1, 2005 cited in U.S. Appl. No. 09/820,582 (Copy Attached).
Office Action dated Jul. 27, 2005 cited in U.S. Appl. No. 09/820,582 (Copy Attached).
Office Action dated Dec. 28, 2005 cited in U.S. Appl. No. 09/820,582 (Copy Attached).
Office Action dated Jun. 13, 2006 cited in U.S. Appl. No. 09/820,582 (Copy Attached).
Office Action dated May 3, 2007 cited in U.S. Appl. No. 09/820,582 (Copy Attached).
Office Action dated Nov. 16, 2007 cited in U.S. Appl. No. 09/820,582 (Copy Attached).
Office Action dated Mar. 12, 2004 cited in U.S. Appl. No. 09/567,474 (Copy Attached).
Office Action dated Jun. 13, 2005 cited in U.S. Appl. No. 09/567,474 (Copy Attached).
Office Action dated Dec. 1, 2005 cited in U.S. Appl. No. 09/567,474 (Copy Attached).
Office Action dated Mar. 10, 2006 cited in U.S. Appl. No. 09/567,474 (Copy Attached).
Office Action dated Aug. 24, 2006 cited in U.S. Appl. No. 09/567,474 (Copy Attached).
Office Action dated May 2, 2007 cited in U.S. Appl. No. 09/567,474 (Copy Attached).
Office Action dated Apr. 30, 2008 cited in U.S. Appl. No. 09/567,474 (Copy Attached).
Notice of Allowance dated Oct. 6, 2008 cited in U.S. Appl. No. 09/567,474 (Copy Attached).
R. Panabaker, S. Wegerif, and D. Zigmond, "The Transmission of IP Over the Vertical Blanking Interval of a Television Signal," (Feb. 1999).
Advanced Television Enhancement Forum Specification (ATVEF), Version 1.1 revision 26, (Feb. 2, 1999).
"How the Internet Works," Preston Gralla (1999), chapter 20.
Electronic Industries Association EIA-746-A, "Transport of Internet Uniform Resource Locator (URL) Information Using Text-2 (T-2) Service" (Sep. 1998).
S. Deering, "Host Extensions for IP Multicasting" (Aug. 1989).
J. Postel, "User Datagram Protocol," (Aug. 1980), identified as page "ftp://ftp.isi.edu/in-notes/rfc768.txt".

* cited by examiner

MODIFYING AN ELECTRONIC PROGRAM GUIDE BASED ON VIEWER STATISTICS

The present application is a continuation-in-part of U.S. patent application Ser. No. 09/820,582, entitled "Regulating the Quality of a Broadcast," filed Mar. 20, 2001, which is incorporated herein by reference. The present application further incorporates the entire contents of U.S. patent application Ser. No. 09/567,474 by reference herein.

BACKGROUND OF THE INVENTION

1. The Field of the Invention

The present invention relates to displaying information to viewers regarding the number of other viewers who are watching specified television programs. More specifically, the present invention relates to using a back channel to gather statistics relating to real time viewing behavior and using the gathered information to modify electronic program guides (EPGs) so as to inform viewers of the number of other viewers who are watching the television programs.

2. Background and Related Art

Historically, television has been a source of entertainment for the general public and a medium through which an enormous number of individuals can be reached. During recent years, cable television systems and digital satellite broadcast systems have greatly increased the number of television channels that are available to viewers. Selecting from among tens or even hundreds of television programs can be daunting. Viewers typically attempt to find interesting programs by flipping through channels. Unfortunately, this practice is time consuming and often annoys other viewers who happen to be watching the same television. There is therefore a need for a means of more quickly locating programs of interest.

Television directories have been developed to simplify the process of determining which television programs are being broadcast. Such television directories are published in weekly printed guides or, more recently, using electronic program guides displayed to viewers on the television screen. Electronic program guides enable viewers to conveniently find programs that may be of interest and to manage the functionality of the television system by, for example, tuning to or recording the desired program.

Although television directories are a useful resource for television viewers, conventional electronic program guides and other directories are limited due to the fact that viewers using electronic program guides have been isolated from the rest of the viewing public. For example, as a viewer scrolls through the listings of an electronic program guide, the viewer has no reliable way of knowing which programs will turn out to have been extremely popular or to have been viewed by the friends or acquaintances of the viewer. In hindsight, viewers often wish they could have viewed programs that were particularly interesting. For example, a viewer might feel excluded when friends or coworkers are excitedly discussing a program the viewer missed the night before. Such a viewer would benefit from a system that would alert him or her to programs that relatively large numbers of other viewers are watching.

One of the reasons for which electronic program guides have typically operated in isolation from the rest of the viewing public is that the technology that has been conventionally used to gather viewing statistics does not operate in real time. In one current method of gathering such statistics, members of the viewing public are paid by businesses to record in logbooks the television channels they watch during a sample period of time and then mail the logbooks to a central location after the completion of the sample period. More recently, this basic technique has been enhanced with systems that electronically record viewing behavior. In either case, however, the process of gathering and processing this viewing data introduces latency on the order of hours or days. This method is useful for gathering historical data associated with viewing behavior, but is clearly not useful for informing real time viewing decisions.

SUMMARY OF THE INVENTION

The present invention relates to systems and methods for utilizing a back channel as a feedback system to reveal what other television viewers are watching at a given moment. More specifically, the present invention is directed to tracking viewer behavior information at home entertainment systems corresponding to specific television programs broadcast, transmitting the tracked information as feedback across a back channel, and using the viewer behavior statistics to display information on electronic program guides regarding the number of viewers who are watching currently-broadcasted television programs.

Implementation of the present invention uses a back channel as a feedback system that obtains and reports actual information as to what and how a broadcast is being used. The implementation may take place in association with a set-top box, cable or satellite box, television set, personal computer, or any other device that is included in a home entertainment system and has the processing capabilities to perform the operations disclosed herein. In one implementation, addressable set-top boxes track user behavior information and send the information in real time through the use of a back channel. Alternatively, the user behavior information is periodically uploaded from the set-top boxes to a satellite link.

Because the process of gathering the viewing statistics is in real time or nearly so, the improved feedback gives television viewers more accurate, readily identifiable information on program viewer data. For example, an EPG displays a list of currently (or recently) broadcast programs. The EPG display includes some visible indicia that specifies the absolute or relative number of other viewers who are watching the corresponding programs. The user may then select and view programs corresponding to certain color or iconic indicia. Any of a variety of visible indicia can be used on the EPGs, including color, size, order, brightness, etc., to indicate the absolute or relative numbers of viewers who are viewing the corresponding programs. In this manner, a viewer can look at the EPG and determine, for example, which group of currently-broadcasted programs is the most popular and then select from among this group.

The improved feedback mechanism also allows a form of television "chat", similar to what is found in popular instant messaging software data such as Microsoft's MSN Messenger, or America Online's AOL Instant Messenger, etc. In this case, a viewer may subscribe to a group of "buddies", or a viewing preference group. When one of the viewer's buddies watches a particular program, the EPG displays a specific color-code or icon associated with the show the buddy is watching (or has watched), assuming the buddy takes no effort to block his viewing habits. Thus, subscribers to a particular buddies group may be alerted to shows that other buddies—having similar viewing interests—are watching. The viewer may then simply watch the alerted program, or simultaneously engage the buddy in a form of television chat.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
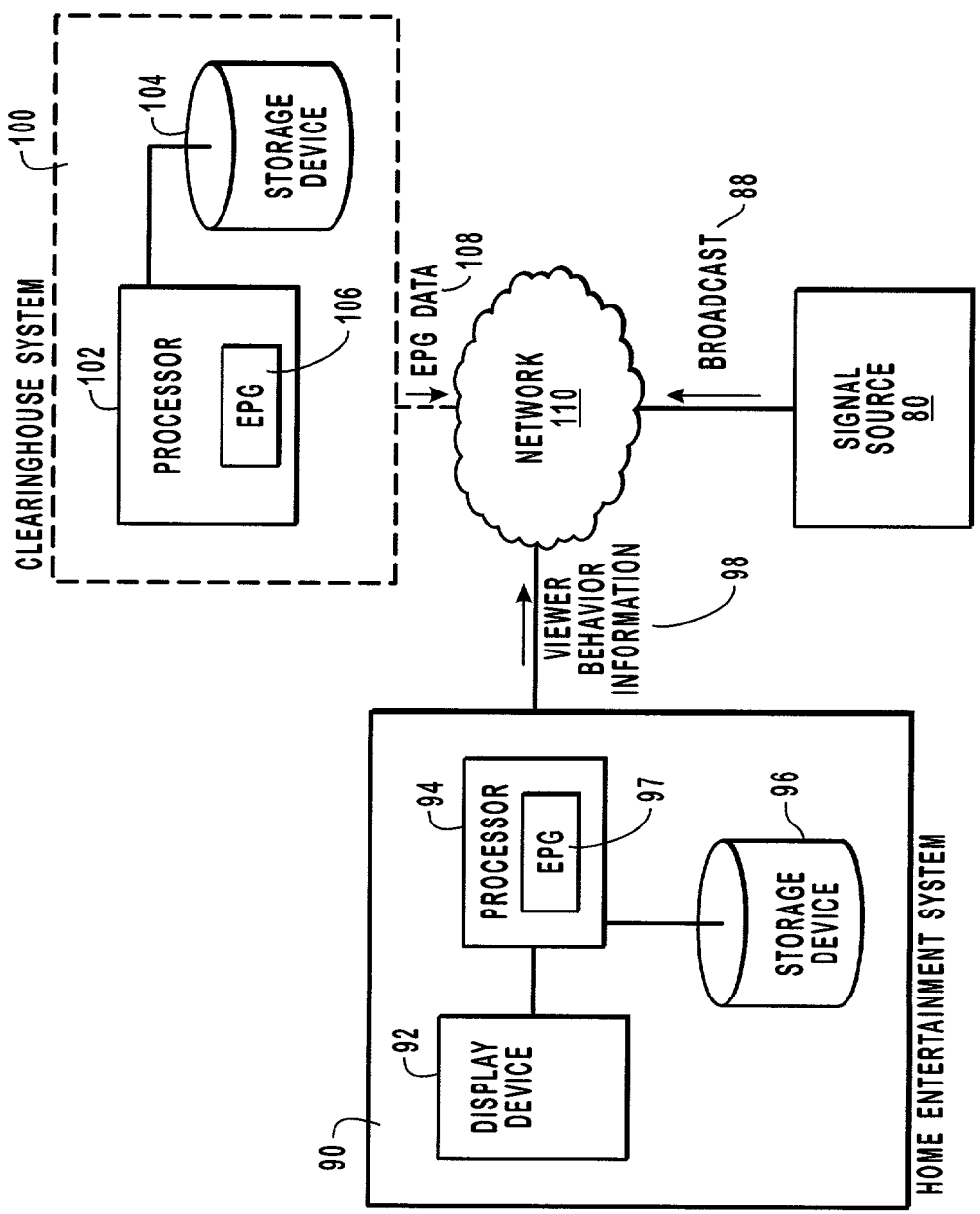
FIG. 1 illustrates a networked system that allows for tracking information and transmitting the tracked information via a back channel as feedback.

The present invention relates to systems and methods for utilizing a back channel as a feedback system to reveal what television viewers are watching at a given moment. As the viewing behavior statistics are gathered in real time, the EPGs displayed to viewers can be modified to indicate which of the currently-broadcasted programs are the most popular. The EPG can be modified in any of a various ways that communicate to viewers the absolute or relative number of other viewers who are watching the television programs corresponding to the EPG listings.

As under herein, unless otherwise specified, the term "number of viewers" when used to describe the viewing behavior or viewer activity associated with television programs, extends to absolute numbers of viewers, relative numbers of viewers, percentage of the viewing public, or any other metric that can indicate a degree to which a television program is being viewed, and is not limited to an absolute number of viewers. The "viewing behavior" associated with television programs extends to any viewer activity associated with television programs, including tuning and display of a television program that may be viewed in real time, recording a television program, scheduling a future recording of a television program, and setting a reminder to be displayed to a viewer for a television program indicating that the television program is to be broadcast. As used herein, the term "television" extends to any display device or system on which broadcast programming is displayed, and includes conventional television sets, personal computers or special purpose computing devices and their associated display devices on which broadcast programming can be displayed, or other such display device. The term "home entertainment system" extends to systems that include a television as defined herein along with a processing device that can perform the methods disclosed herein for monitoring the viewing behavior of the viewer, regardless of whether the system is included in a residence, a business, etc.

Embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of computer-executable instructions, such as program modules, being executed by set-top boxes or other computers. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The methods for using the back channel to gather viewing behavior information in real time will be discussed below, followed by a description of various techniques for modifying the display of an electronic program guide to show the number of viewers who are watching specified television programs.

1. Tracking Viewer Behavior Information

FIG. 1 illustrates an exemplary networked system that receives a broadcast from a signal source that is displayed on a television. The system tracks viewer behavior information at the television and transmits the tracked information in either real time or nearly so via a back channel, which is a communication link, so as to allow electronic program guides to be modified to show the number of viewers who are watching particular television programs or who have engaged in other viewing activities associated with the particular television programs. As used herein, the term "real time" represents processing in a time frame that is current enough to distribute viewing behavior statistics to the processing systems used by other viewers so that electronic program guides can be modified to show the number of viewers watching currently-broadcasted programs. In order to provide viewing behavior statistics for currently-broadcasted programs, it can be appreciated that the time frame for processing the information and the acceptable latency are typically on the order of minutes rather than hours or days.

In one embodiment, the tracked information is transmitted via a back channel to the signal source. In another embodiment, the tracked information is transmitted via a back channel to a clearinghouse system. Furthermore, in one embodiment the information is tracked anonymously such that the identity of the viewers is not disclosed.

FIG. 1 illustrates an example of the interaction between a home entertainment system 90, a signal source 80, and optionally a clearinghouse system 100 in accordance with the present invention. Signal source 80 provides a broadcast 88 to home entertainment system 90 by sending the service across network 110. The broadcast 88 represents data that can be output, recorded, or otherwise utilized at home entertainment system 90. Network 110 can include a cable or optic connection, a terrestrial antenna system, a satellite system, and/or any device or medium capable of transmitting broadcast programming to home entertainment system 90.

While the illustrated embodiment provides signal source 80 as a single entity, those familiar with the art of transmitting a broadcast can appreciate that a signal source may comprise a system of entities. For example, a central broadcast facility may broadcast to a variety of local facilities that in turn broadcast to home entertainment systems. As such, the feedback across the back channels can take place between the home entertainment systems and the local facilities and/or between the local facilities and the central broadcast facility. Furthermore, the dynamic restructuring of the broadcast can take place at any level of the broadcast transmission, including at the central facility or at one or more of the local facilities.

Home entertainment system 90 tracks each time broadcast 88 is output, recorded or otherwise utilized at home entertainment system 90, by generating viewer behavior information to indicate that the broadcast 88 was output, recorded or otherwise utilized at home entertainment system 90. The viewer behavior information may further indicate how the broadcast 88 was output, recorded or otherwise utilized at home entertainment system 90.

In one embodiment, data that is used to generate the tracked information is made available through the use of a data source. The data source is used to correlate the state of the television (e.g., the channel to which the television is tuned) to information identifying particular television programs. In this manner, the particular television program to which the television is tuned can be identified.

One example of a data source is an electronic program guide. EPGs are widely commercially available, and general concepts relating thereto will be understood by those skilled in the art. An EPG, for example, can be employed that is tailored to include programming information specifically selected for use with the present invention. However, the present invention can be practiced with substantially any existing data source. In a further embodiment, the EPG data is kept current at home entertainment system 90 by updating the EPG data at home entertainment system 90. The updating of EPG 97 can take place in a number of ways. By way of example, EPG 97 could be updated via direct-dial communication over standard telephone lines, a satellite communication system, a cable system, or over a network, including the Internet. The updating information can come from a variety of sources such as from a clearinghouse system 100, as indicated by EPG data 108, or from a separate source, including the signal source 80.

The amount and type of information available through an EPG is diverse, yet specific. The information can include any information related to the broadcast being received such as the provider of the broadcast, the type of broadcast, the date and time that the broadcast is being provided, the origination of the broadcast, and the manner in which the broadcast is being supplied. By way of example, and not limitation, the EPG information may include information specific to one or more programs of the broadcast such as the title of a program, the episode, the director of the program, the performing actors, program ratings, etc. The information may also include information specific to a channel of the broadcast that is tunable at the home entertainment system 90, such as the channel number, the call letters of the station, the network affiliation, the transmission frequency, the origin of transmission, etc. The information furthermore may include other descriptive information specific to the broadcaster or subscriber, such as whether the signal originates from a local station, a network station, a cable station, or a satellite station, the location of the subscriber, the date subscribed, etc.

Therefore, information describing the viewing behavior (e.g., tuning, display, recording, scheduled recording, or setting a reminder) associated with particular television programs is tracked at home entertainment system 90. The tracking may be initiated upon the occurrence of an event performed by a viewer of home entertainment system 90. In this description and in the claims, the term "event" encompasses an instructional input received by a home entertainment system, whereby video data corresponding to broadcast 88 is output, recorded or otherwise utilized at home entertainment system 90. The input may be entered by the viewer or some other source. The term "event" also extends to other changes in programming displayed on the home entertainment system without viewer input, one example being the beginning of a scheduled program on an already-tuned channel.

Once an event occurs, home entertainment system 90 couples the occurrence of the event with information specific to the program output, recorded, or otherwise utilized. This may include, for example, coupling unique IDs from an EPG to an occurrence of an event. The IDs identify such information as the program viewed and the channel tuned. Thus, a processor 94 at home entertainment system 90 that is coupled with computer-executable instructions represents one example of means for generating viewer behavior.

Depending on the type and volume of viewer behavior information that is desired to be tracked, specific data corresponding to the broadcast can be requested remotely. In general, the type of viewer behavior is at least sufficiently detailed to enable the system to determine the television program, if any, that is being displayed on the television. For example, the operator of central clearinghouse 100 to which the viewer behavior information is to be sent might decide that the desired types of information from the EPG that are to be included in the viewer behavior information are a channel ID, a subscriber ID, a program ID and title, the city and state of the channel, and the current date and time. Thus for each event, the foregoing information contained in the appropriate data fields of the EPG and information otherwise maintained at the home entertainment system is identified and stored as an instance of viewer behavior information.

Although the information used to compile the tracked viewer behavior information can be conveniently retrieved from a signal source as described above, the information can alternatively be retrieved directly from data transmitted on a signal. For instance, data is often encoded in the vertical blanking interval of a television signal. In other situations, an entire channel can be dedicated to transmitting data on a signal. In any of these cases, the encoded data can represent a description of a broadcast.

As the viewing behavior information is generated and compiled at home entertainment system 90, the information is transmitted in substantially real time so that the information can be used to modify the EPGs used by other viewers so as to show the number of viewers who are watching particular television programs. However, in an embodiment in which scheduled recordings are tracked, scheduled recording or reminder information can be transmitted to a clearinghouse system 100 at any time after the viewer has scheduled the recording or the reminder. An advantage of the scheduled recording or reminding embodiment is that when a viewer tunes to the guide at broadcast times, the guide data is already preliminarily filtered on the basis of the scheduled record or remind events. As the broadcast continues, the guide data can be updated as the system receives more data about what programs viewers are actually watching. As described above, the tracked viewer behavior information generated at home entertainment system 90 is transmitted as feedback across a back channel, as illustrated in FIG. 1 by viewer behavior information 98. In one embodiment, the tracked information is transmitted in real time to a remote location, such as to the signal source 80 or to a clearinghouse system 100.

The back channel used to transmit the viewer behavior information can be any communication link established for transmitting data upstream to the signal source 80 or clearinghouse system 100. In embodiments that use a cable television system to distribute the broadcast signal, the back channel can be the cable infrastructure connecting the cable head end with individual home entertainment systems. In embodiments that use a digital satellite broadcast system or a terrestrial antenna system to distribute the broadcast signal, the back channel can be a telephone connection between a set-top box or other processing device at the home entertainment system and the signal source 80 or clearinghouse system 100. In this case, the telephone connection can be either directly to the signal source 80 or clearinghouse 100 or to a server on the Internet.

Figure 2:
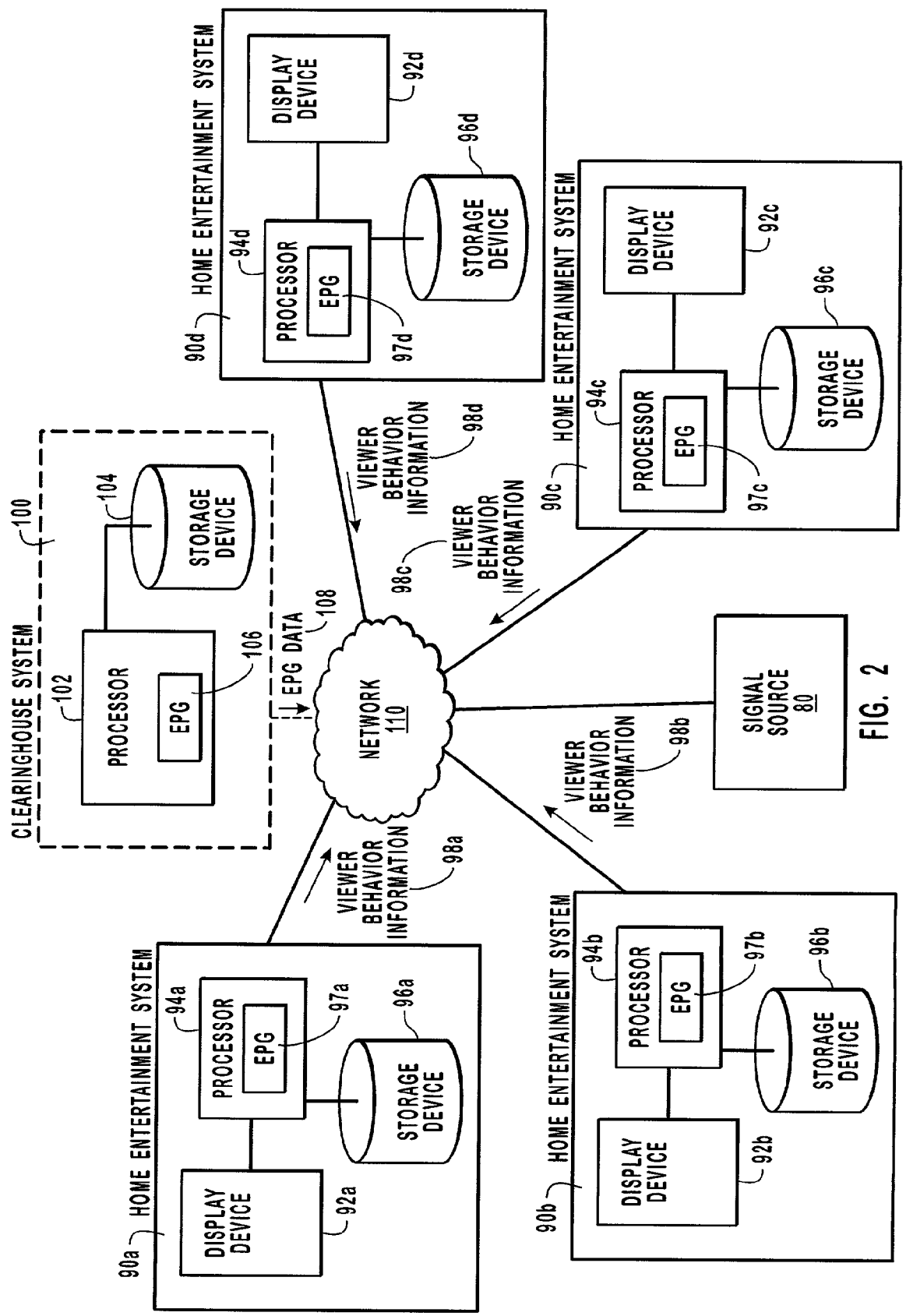
FIG. 2 illustrates the gathering of tracked information from a plurality of home entertainment systems via various back channels.

Since the viewer behavior information is used to present information relating to the number of viewers watching particular television broadcasts, the methods of generating and transmitting the information is typically practiced in a plurality of networked home entertainment systems. FIG. 2 illustrates a networked feedback system that demonstrates the transmission of tracked viewer behavior information between a plurality of home entertainment systems 90 and one or more remote locations via a network 110. The networked feedback system illustrated in FIG. 2 is representative of networks having any number of associated home entertainment systems.

Figure 3:
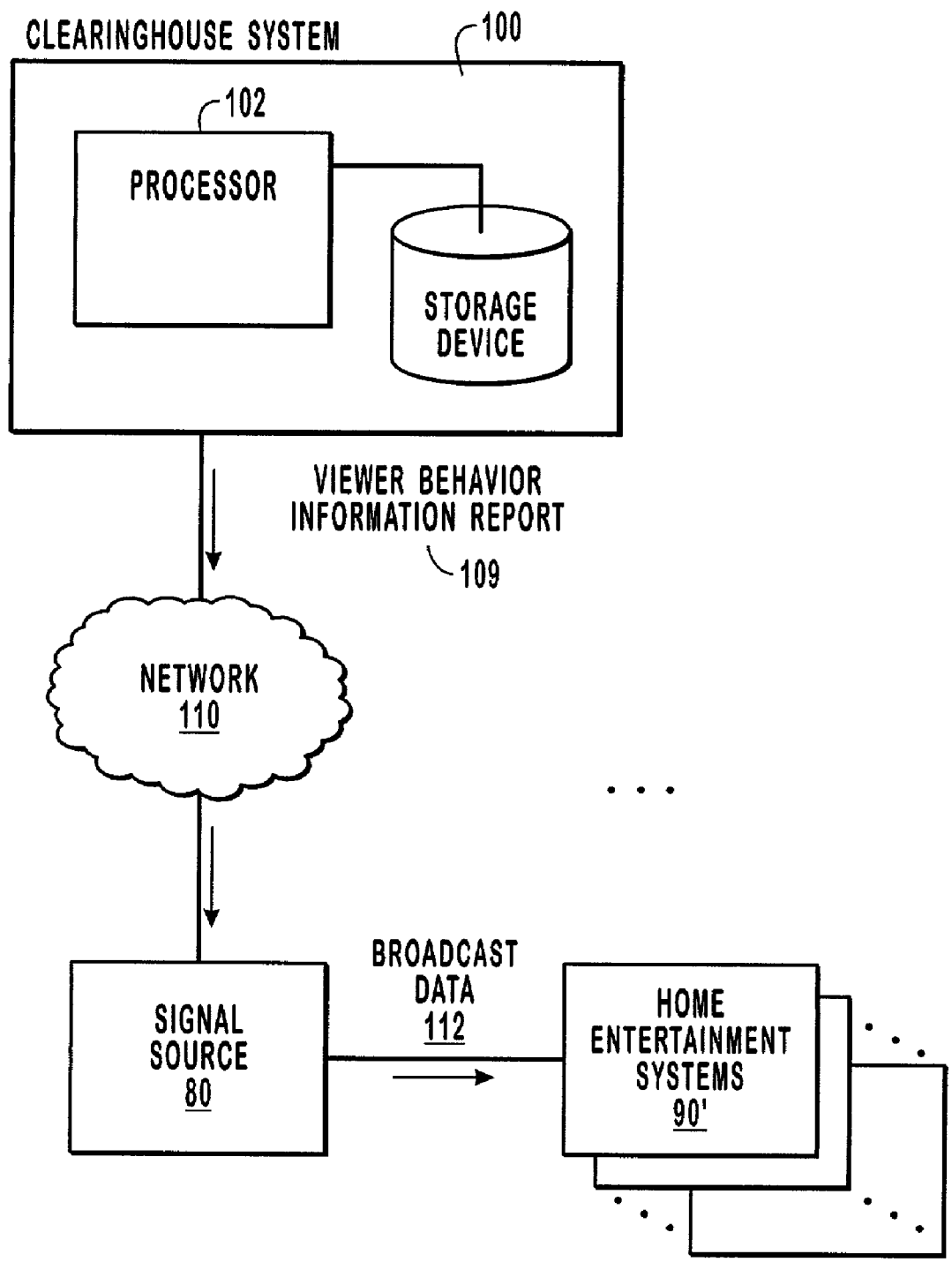
FIG. 3 illustrates an example of a networked system that utilizes a central clearinghouse to gather the viewing behavior information to enable EPGs to be modified.

Each home entertainment system of FIG. 2 includes a display device 92, a processor 94, an EPG 97, and a local storage device 96. A signal carrying a broadcast is transmitted from a signal source 80 and received by the home entertainment systems 90. Processors 94 independently gather and transmit the viewer behavior information tracked at the corresponding home entertainment systems 90 so as to indicate which television program, if any, is displayed, recorded or otherwise utilized at the respective home entertainment system 90. While FIG. 3 illustrates each of the home entertainment systems 90 transmitting viewer behavior information 98 in response to tuning to the broadcast sent out from signal source 80, every home entertainment system does not need to tune to the broadcast and/or transmit viewer behavior information. In one embodiment, statistical analysis is performed at the clearinghouse system 100 or at the signal source 80 to determine when a statistically significant number of home entertainment systems have transmitted viewer behavior information to enable reliable information regarding the viewing behavior to be displayed on the EPGs 97, as will be further explained below. Statistical methods used to sample the home entertainment systems 90 will be understood by those of skill in the art upon learning of the invention disclosed herein.

The tracked viewer behavior information 98 of each home entertainment system 90 is transmitted to one or more locations that are generally remote with respect to the home entertainment systems 90. When the one or more remote locations comprise a clearinghouse system 100, a storage device 104 gathers the tracked information from the myriad of home entertainment systems 90. The tracked information arrives at the one or more remote locations in a format that is usable or close to being usable, because it can include information that identifies and describes programming displayed, rather than merely including a channel number.

With reference to FIG. 3, once the viewing behavior information is received at the clearinghouse system 100, a processor 102 processes the information and/or makes the information available to modify the display of the EPGs of viewers in the system. Processor 102 is otherwise referred to herein as a central processor, in that it processes data provided from a plurality of home entertainment systems. The term "central" in this sense does not connote any particular physical location. Where unreliable or potentially unreliable back channels are employed to transmit the information, the processing of the tracked information includes performing a statistical analysis as to the reliability of the sampling received. Again, these statistical methods will be understood by those of skill in the art upon learning of the invention disclosed herein.

The processing of the tracked information includes an analysis of the data in order to enable the EPGs to be modified. Once the viewing behavior information is processed at clearinghouse system 100 the results, illustrated as information report 109, is provided to an entity that modifies the display of the electronic program guides. There are at least two basic ways in which the EPGs can be modified according to the invention. In a first embodiment, the raw viewing behavior information that enables the EPG to be modified is transmitted to the home entertainment systems, enabling a set-top box or another processing device to process the viewing behavior information and modify the graphical user interface on which the EPG data is displayed. Thus, this embodiment enables the individual home entertainment systems to modify the EPGs.

In a second embodiment, the viewing behavior information is processed by an EPG data source, which processes the viewing behavior information and the other data associated with the EPG so as to define an EPG user interface image that shows the number of viewers who are watching particular television programs. The processing of the data is generally similar in each of these two embodiments, although in this second embodiment, much of the processing is performed centrally rather than in a distributed manner at the individual home entertainment systems.

FIG. 3 illustrates in greater detail the first embodiment described above, in which the raw viewing behavior information is transmitted to individual home entertainment systems, where the information is processed to modify the EPG. In many instances, processing at the individual home entertainment systems is preferable, in view of the real time requirements for displaying the number of viewers who are watching currently broadcasted programs. In an alternative embodiment, the processing is performed centrally and updated electronic program guide information is distributed to the home entertainment systems.

As shown in FIG. 3, the viewer behavior information report 109 is transmitted to signal source 80, which represents at least one entity associated with transmitting or delivering the broadcast signal 112 to the home entertainment systems 90' of the invention, which can be the same as or different from the home entertainment systems from which the viewing behavior information was obtained. Report 109 is then inserted into the broadcast signal 112 in, for example, the vertical blanking interval or the overscan region of the broadcast signal 112, such that the report can be delivered to and processed by the individual home entertainment systems. In digital systems, the report can be encoded in data packets that are included in a transport stream transmitted to the home entertainment systems 90 or as part of a data carousel broadcast to the home entertainment systems 90. There are a variety of appropriate techniques for inserting information, such at report 109, into the broadcast signal 112, and those of skill in the art, upon learning of the invention disclosed herein, will understand such techniques. Alternatively, the report 109 can be delivered to the home entertainment systems 90' using other communication media, such as over the Internet. For example, in this alternative embodiment, in order to update and modify an EPG according to the invention, a processing device issues a request over the Internet for report 109.

Report 109 is sufficiently detailed to enable the electronic program guide to be modified to indicate the number of viewers who are watching particular television programs or who are engaged in other viewing activities. The level of detail included in report 109 depends on the level of detail that is to be displayed on the EPG. If the EPG is to be modified to simply show a ranking of, for example, the top ten currently-broadcasted programs in terms of viewership, report 109 can merely include information defining this ranking. If, however, the EPG is to display the absolute number or percentage of viewers associated with each television program, report 109 includes more detailed statistical information that enables the EPG to be modified in this manner. As will be further described below, the EPG can be modified with even more information, including the identity of "buddies" and the television programs that such buddies may be watching. In this situation, report 109 includes correspondingly more information and can be tailored to specific viewers having specific buddy lists.

2. Modifying EPGs to Show Viewing Behavior

Figure 4:
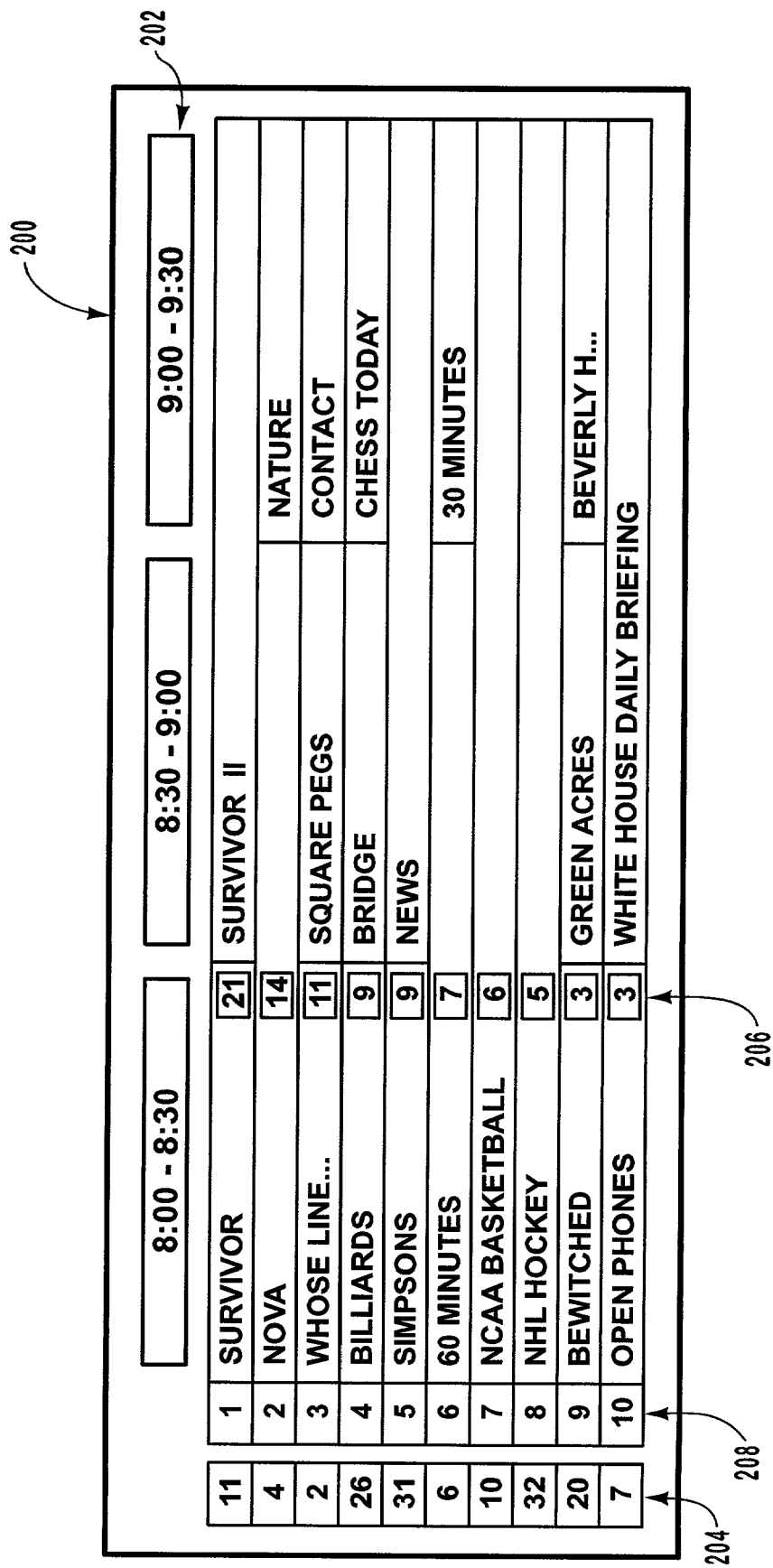
FIG. 4 illustrates an example of an EPG that has been modified to show the number of viewers who are watching each of several currently-broadcasted television programs.

FIG. 4 illustrates an example of an EPG that has been modified to indicate the number of viewers who are watching currently-broadcasted programs. EPG 200 represents an image that has been generated using the viewing behavior information that has been generated and reported as described above in reference to FIGS. 1-3. As shown in FIG. 4, EPG 200 includes a grid that indicates the programs that are being broadcast according to channel 204 and time 202. In this manner, EPG 200 can be based on any of a variety of conventional EPGs that show programs using a grid, with the inventive modifications that are described herein.

FIG. 4 illustrates the television programs being ranked in order of viewership (shown at 208), along with a percentage of the viewing population currently watching each program (shown at 206). Both the ranking and the percentage figures represent examples of techniques for displaying the number of viewers who are watching particular television programs. As shown in FIG. 4, the television programs are ranked in decreasing order of viewership. This enables the viewer to quickly identify the television programs that are the most popular and facilitates the decision process regarding the television program that will be selected by the viewer.

In this example, "Survivor" on channel 11, is ranked first in terms of the numbers of viewers watching the program. In percentage terms, "Survivor" currently is being viewed by approximately 21% of the viewing public. In this example, the remaining programs of the list of top ten programs are also ranked in order of viewership and have an associated percentage of viewers displayed on EPG 200.

It should be understood that FIG. 4 illustrates only two of the many different ways encompassed by the invention for displaying the number of viewers who are watching particular television programs. Other examples include, but are not limited to, selecting the color, shape, border, or visual effects used to display entries in the grid of EPG 200, placing icons or animation on the grid entries. Alternatively, the number of viewers can be displayed by filtering the television programs by the number of viewers, such that programs having fewer than a threshold number are not displayed on the EPG. Yet another technique involves assigning viewership ratings indicating the general level of viewership rather than specific numbers (e.g., a rating of 1-5, with 5 indicating relatively large numbers of viewers). In general, the EPGs can be modified in substantially any desired way to indicate the number of viewers who are watching particular television programs. Techniques for incorporating these various EPG interface features to the EPG image 200 will be readily understood by those skilled in the art upon learning of the disclosure made herein.

In another embodiment, the home entertainment system can be programmed to force-tune to any program that has a viewership greater than a selected threshold. Thus, if the viewer elects to take advantage of this feature, the viewer activates the feature in the set-top box or other processing device, such that when a percentage of the viewing public higher than the threshold percentage has tuned to a particular program, the viewer's television will also be forced to tune to the same program. This feature enables the viewer to reliably view any highly popular program, which, depending on the selected threshold, is likely to be an important or memorable television program.

One embodiment of the invention is adapted for use with instant messaging or chat sessions with individuals who are also watching television programs. Various companies, such as Microsoft Corporation and America Online, offer instant messaging services that allow people connected to the Internet to send instant messages to one another. Instant messaging systems typically allow a viewer to receive a message alerting him or her that a friend is currently connected to the Internet. In a typical example, each client creates a list of friends, or "buddies." In conventional systems, when the client connects to the Internet, a server communicates with the client to determine whether any of the listed friends are also connected to the Internet. If so, the server notifies the client. The server periodically checks for friends and announces their presence should they log on.

Figure 5:
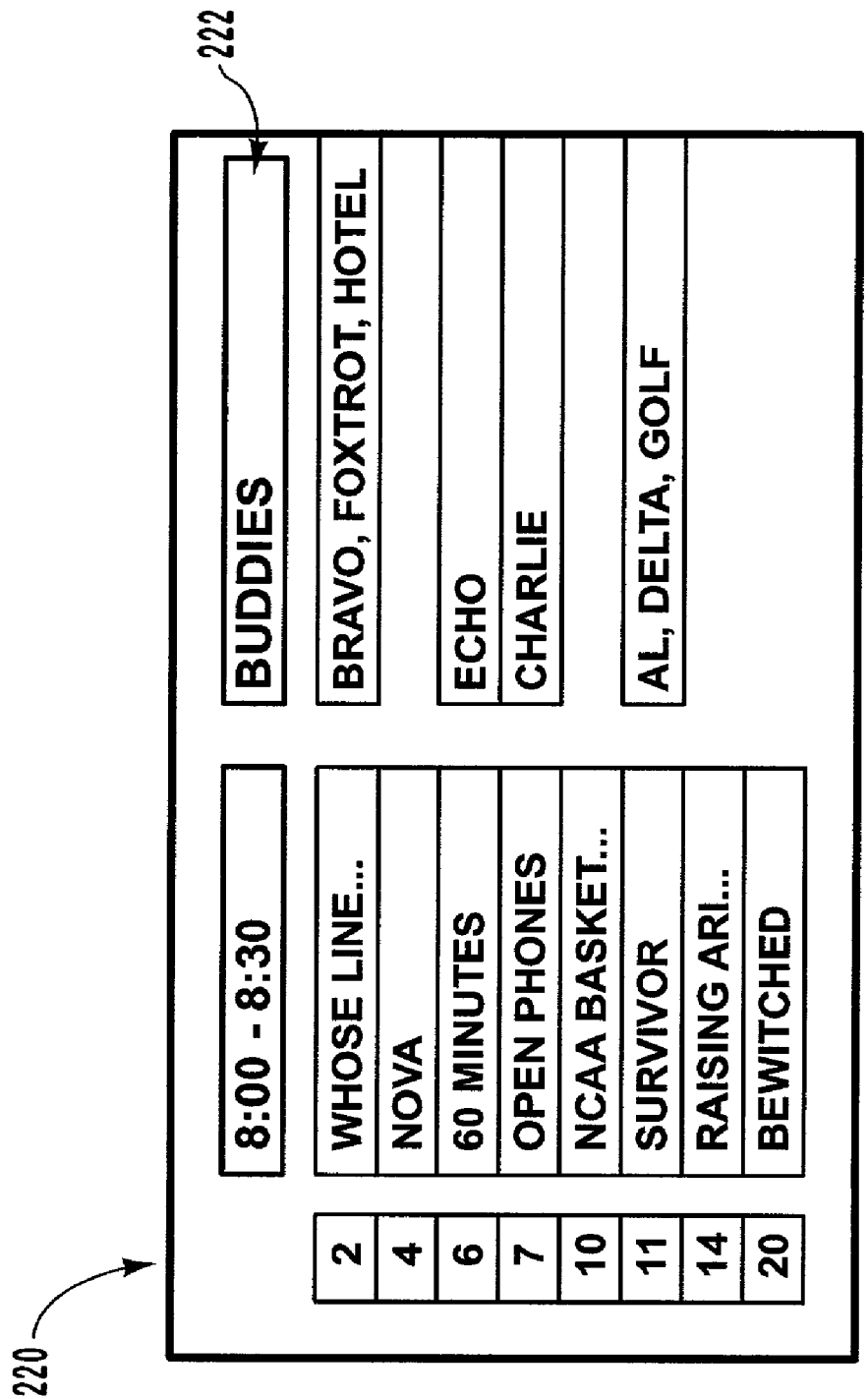
FIG. 5 illustrates an example of an EPG that has been modified to identify buddies and the programs that are being watched by the buddies.

As shown in FIG. 5, an EPG 220 can be modified to disclose the identify of buddies 222 who are watching particular programs. This identification of buddies 222 can and further avoids reporting a television program as being watched when a viewer merely skips through the show before settling upon another.

Where privacy is a concern, joining a group requires some form of permission from members of the group and/or from the entity that set up the group. Some viewers may not want others to know what they are watching. Thus, one embodiment of the inventions allows viewers to configure their televisions to block messages that report their viewing behavior information or to prevent their identity from being associated with the viewing behavior information.

3. Exemplary Operating Environment

The invention has been described above in the context of televisions having associated set-top boxes or processing devices that generate viewing behavior information and also in the context of modifying EPGs to display the number of viewers who are watching particular television programs. A specific example of a suitable set-top box or processing device that can be used with the invention is described below in reference to FIG. 6. However, it is to be understood that the invention can be practiced with substantially any television and associated processing device, including personal computers, dedicated Internet terminals, set-top boxes, embedded devices, etc.

Figure 6:
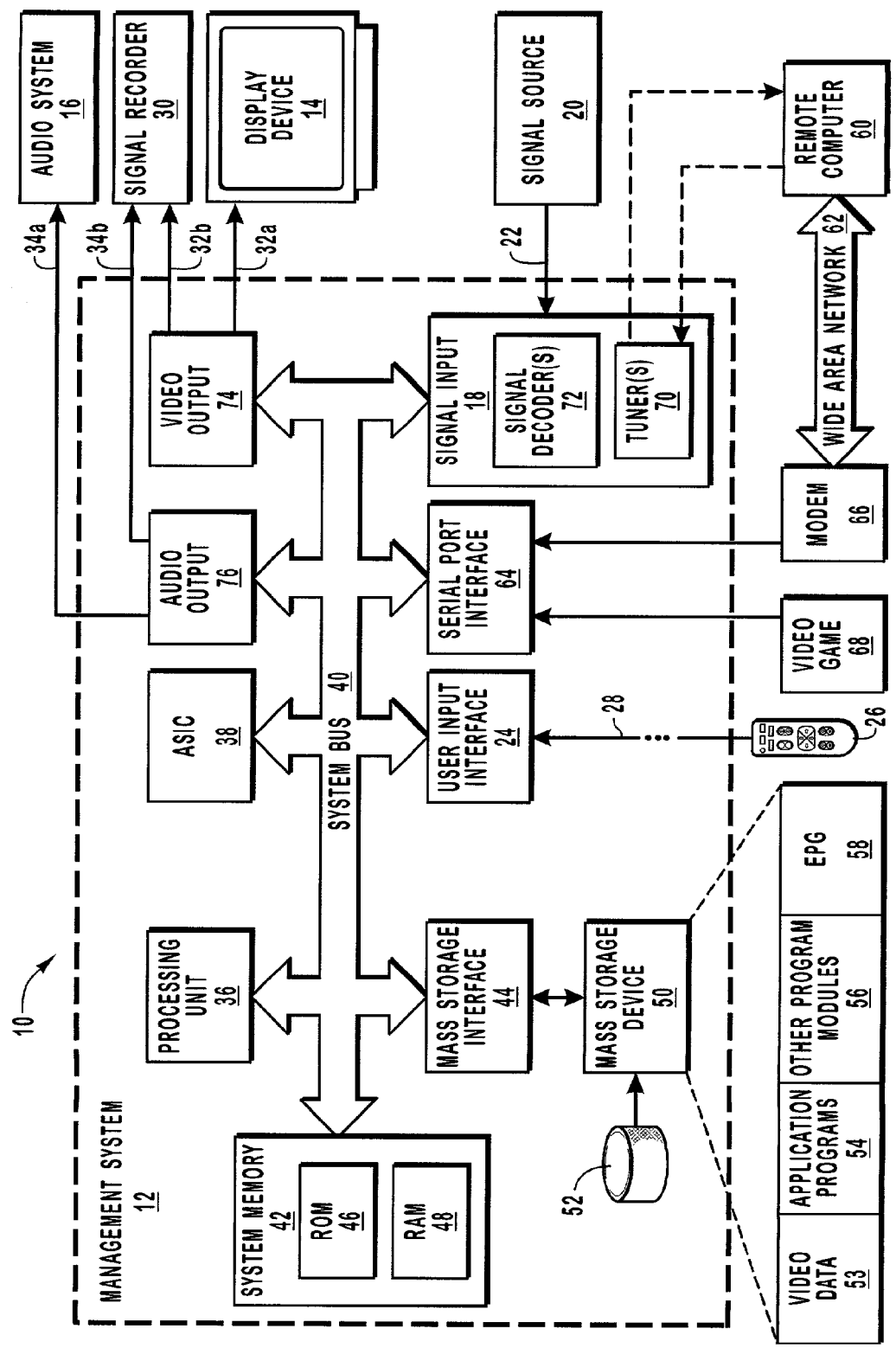
FIG. 6 illustrates an exemplary operating environment that can be used in conjunction with the invention.

In one embodiment, the present invention is implemented in combination with a system that uses a conventional television screen or other display unit to display information and includes a set-top box or a similar processing device that has been adapted to perform the operations that have been described herein. FIG. 6 illustrates a system that includes a processing device 10, a display device 14 and an audio system 16. Processing device 10 may be integrally positioned with or separate from display device 14, which may be a television supplement or replace conventional techniques of identifying whether particular buddies are accessible online. In this example, buddies "Bravo", "Foxtrot", and "Hotel" are viewing the program "Whose Line . . . "; buddy "Echo" is viewing the program "60 Minutes"; buddy "Charlie" is viewing the program "NCAA Basketball"; and buddies "Alpha", "Delta", and "Golf" are viewing the program "Survivor". In this manner, the viewer of EPG 220 can learn in a glance which of the buddies are watching programs. This information can be used to enable the viewer to engage in a chat or instant messaging session with any of the specified buddies while watching the television program.

In the embodiments in which buddies are listed, the report 109 of FIG. 3 includes information specific to a buddy list of the viewer of EPG 220 and information identifying individual buddies and the programs that are being watched by them. In response to the information provided in report 109, the processing device associated with the home entertainment system of the viewer modifies the EPG 220 to display the information regarding the viewing status of the buddies. Details regarding the information provided in the report 109 is described above in reference to FIG. 3. Further information regarding buddy lists and techniques for tracking buddies are disclosed in one of the parent applications, U.S. patent application Ser. No. 09/567,474, entitled "Methods and Apparatus for Alerting Television Viewers to the Programs Other Viewers are Watching," filed May 8, 2000, which has been incorporated herein by reference.

In one embodiment, viewers can sign up to be notified immediately if a selected buddy changes channels. For example, one member might be notified when a friend switches to a different program. The viewer behavior information reports only indicate that a buddy has changed channels if the buddy remains tuned into the given channel for a specified time period, such as one minute, to avoid unnecessary messages that might be initiated by channel surfing, display or a conventional computer monitor. An audio output module 76 communicates with audio system 16 using an audio link 34 to enable audio system to render the audio data. Similarly, a video output module 74 communicates with display device 14 using a video link 32 to render the video images.

Processing device 10 includes a user input interface 24, which receives input from an input device 26, such as a remote control, keyboard, microphone, or any other device capable of generating electronic instructions for processing device 10. Input device 26 is communicatively coupled to processing device 10 over an input link 28 so as to enable such control. Input device 26 is particularly useful in systems that provide access to the Internet or provide "chat" or other messaging capabilities.

The operation of processing device 10 is controlled by a central processing unit (CPU), illustrated as processing unit 36, which is coupled to an application-specific integrated circuit (ASIC) 38 and uses computer-executable instructions implemented in software and/or hardwired logic circuitry. Processing unit 36 and ASIC 38 are coupled via a system bus 40, which also interconnects various other system components, such as the system memory 42, mass storage interface 44, user input interface 24 and signal input 18. Processing unit 36 executes software designed to implement features of processing device 10 including the EPGs and the viewing behavior information generating features discussed herein. ASIC 38 contains circuitry that is used to implement certain functions of processing device 10. Instructions, data, and other software necessary for the operation of processing unit 36 and ASIC 38 may be stored in the system memory 42, such as in read-only memory (ROM) 46 and/or in random-access memory (RAM) 48, and/or in a mass storage device 50, which is coupled to mass storage interface 44. ROM 46, RAM 48 and mass storage device 50 are communicatively coupled to ASIC 38 so as to be readable by ASIC 38 and so that data may be written from ASIC 38 to RAM 48 and possibly mass storage device 50.

Mass storage device 50 may be a magnetic hard disk 52 or any other magnetic or optical mass memory device that is capable of storing large amounts of data. Any desired computer-readable instructions or data, including application programs 54, and other program modules 56. Application programs 54 include the EPGs described herein. In systems that provide access to the Internet or chat or instant messaging features, processing device 10 communicates with a remote computer 60 via a wide area network (WAN) 62 by including a serial port interface 64 that is interposed between the system bus 40 and a modem 66, a wireless link, or other means for establishing communications over a WAN that may be internal or external to processing device 10.

While FIG. 6 and the corresponding discussion above provide a general description of a suitable environment in which the invention may be implemented, it will be appreciated that the features of the present invention disclosed herein may be practiced in association with a variety of different system configurations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a central processor that communicates with processing devices associated with televisions, a method of providing information to the processing devices to enable information relating to viewing behavior associated with television programs to be displayed, the method comprising the acts of:

receiving viewing behavior information from a plurality of processing devices associated with televisions, the viewing behavior information specifying viewer activity associated with television programs;

generating a report, based on the viewing behavior information for a viewer group defined by a viewer selection of individuals from a database, that specifies the number of viewers in the group who have engaged in a viewing activity associated with particular television programs at the televisions; and wherein the report is used to modify a display of an electronic program guide that identifies television programs which are being broadcast for display by one or more of the televisions and wherein the electronic program guide groups the television programs based on time at which each of the television programs is being broadcast, and wherein the modification of the electronic program guide includes modifying the display of the electronic program guide in such a manner as to display a list of the television programs in a list that is sorted by decreasing order of viewership, based on the audience in the viewer group that is currently tuned to each of the television programs which are being broadcast for display by one or more of the televisions, and such that a television program that is determined to be currently viewed by more viewers is listed in the list above one or more television programs that are determined to be currently viewed by fewer viewers, and wherein the electronic program guide display is further modified to include, for each television program included in the list, a numeric value that identifies a relative ranking of the television program, relative to other listed television programs, as well as a numeric percentage that identifies a relative percentage of viewers currently viewing the television program as compared to the other listed television programs, and wherein the electronic program guide displays television programs in at least three column groupings that each represent consecutive time blocks, and wherein only the first of the at least three column groupings, which represents a current time of displayed television programs, is modified by the report and such that only the first of the at least three column listings sorts the displayed television programming in a sorted order of viewership, based on the audience in the viewer group that is currently tuned to each of the television programs identified by the electronic program guide.

2. A method as recited in claim 1, wherein the act of receiving viewing behavior comprises receiving the viewing behavior via back channels from the plurality of processing devices.

3. A method as recited in claim 2, wherein the back channels are included in a cable infrastructure of a cable television system.

4. A method as recited in claim 1, wherein the entity is a signal source, wherein the act of transmitting the report is conducted such that the report is received by the signal source and such that the signal source can broadcast the report to the processing devices associated with said one or more of the televisions.

5. A method as recited in claim 1, wherein the report includes information specifying a relative ranking of a plurality of television programs based on the number of viewers watching each of the plurality of television programs.

6. A method as recited in claim 1, wherein the report includes information specifying absolute numbers of viewers watching each of a plurality of television programs.

7. A method as recited in claim 1, wherein the report includes information specifying at least one viewer of a television associated with one of the plurality of processing devices from which the viewing behavior information was received and further specifying a television program being watched by the at least one viewer.

8. A method as recited in claim 1, wherein the acts of receiving viewing behavior information, generating the report, and transmitting the report are conducted in real time to the extent that the report can be used to display on electronic program guides information specifying the numbers of viewers watching currently-broadcasted television programs.

9. A method as recited in claim 1, wherein the viewing activity includes tuning and displaying a particular television program on a television.

10. A method as recited in claim 1, wherein the viewing activity includes recording a particular television program.

11. A method as recited in claim 1, wherein the viewing activity includes scheduling a particular television program to be recorded in the future.

12. A method as recited in claim 1, wherein the viewing activity includes setting a reminder that the television program is to be broadcast.

13. In a processing device that is associated with a television and is included in a system in which viewing behavior information is gathered, a method of displaying information relating to viewership of currently-broadcasted television programs, the method comprising the acts of:

receiving a viewing behavior information report that includes information specifying the number of viewers in a viewer group defined by a viewer selection of individuals from a database who are currently watching particular television programs;

based on the viewing behavior report, modifying electronic program guide data at the processing device to indicate the number of viewers who are currently watching the particular television programs; and displaying the modified electronic program guide on the television, wherein the electronic program guide groups television programs based on time at which each of the television programs is being broadcast, and wherein the modified electronic program guide identifies the particular television programs in a list that is sorted by decreasing order of viewership, based on the audience in the viewer group that is currently tuned to each of the television programs which are being broadcast for display by one or more of the televisions, and such that a television program that is determined to be currently viewed by more viewers is listed in the list above one or more television programs that are determined to be currently viewed by fewer viewers, and wherein the modified electronic program guide is further displayed in such a way that each television program listed in the list includes a numeric value that identifies a relative ranking of the television program, relative to other listed television programs, as well as a numeric percentage that identifies a relative percentage of viewers currently viewing the television program as compared to the other listed television programs, and wherein the electronic program guide displays television programs in at least three column groupings that each represent consecutive time blocks, and wherein only the first of the at least three column groupings, which represents a current time of displayed television programs, is modified by the report and such that only the first of the at least three column listings sorts the displayed television programming in a sorted order of viewership, based on the audience in the viewer group that is currently tuned to each of the television programs identified by the electronic program guide.

14. A method as recited in claim 13, wherein the viewing behavior information report is received in real time to the extent that the electronic program guide can be modified to display information specifying the numbers of viewers watching currently-broadcasted television programs.

15. A method as recited in claim 13, wherein the act of modifying the electronic guide comprises the act of associating particular colors to entries of the electronic program guide, wherein the colors are selected to specify the number of viewers who are watching each of a plurality of programs.

16. A method as recited in claim 13, wherein the act of modifying the electronic program guide comprises the act of selecting the sizes of entries of the electronic program guide, wherein the sizes are selected to specify the number of viewers who are watching each of a plurality of programs.

17. A method as recited in claim 13, wherein the act of modifying the electronic program guide further comprises the act of inserting information into the electronic program guide identifying at least one other viewer and a television program being watched by the at least one other viewer.

18. A method as recited in claim 13, wherein the viewing behavior information report further includes information specifying at least one viewer of another television and a program being watched by the at least one viewer and wherein the method further includes, based on the viewing behavior information report, modifying electronic program guide data stored by the processing device to identify the at least one other viewer and the program being watched by the at least one other viewer.

19. A method as recited in claim 18, wherein the at least one other viewer is selected by the viewer associated with the processing device on a buddy list.

20. A method as recited in claim 19, further comprising the act of transmitting an instant message to a processing system associated with the at least one other viewer.

21. A method as recited in claim 18, wherein the viewing behavior information report further includes information specifying the number of viewers watching each of a plurality of television programs, wherein the act of modifying the electronic program guide further comprises the act of modifying the electronic program guide to indicate the number of said viewers watching each of said plurality of television programs.

22. A method as recited in claim 21, wherein the act of modifying the electronic program guide to indicate the number of viewers comprises the act of associating particular colors to entries of the electronic program guide, wherein the colors are selected to specify the number of viewers who are watching each of the plurality of programs.

23. A method as recited in claim 13, wherein the method further includes automatically forcing the television to tune to a currently-broadcasted television program that is determined to have a level of viewership that meets or exceeds a predetermined level of viewership requirement, the determined level of viewership being based on the information in the viewing behavior information.

24. A physical storage media encoded with computer-executable instructions for implementing a method, in a central processor that communicates with processing devices associated with televisions, for providing information to the processing devices to enable information relating to viewing behavior associated with television programs to be displayed, wherein the method includes:

receiving viewing behavior information from a plurality of processing devices associated with televisions, the viewing behavior information specifying viewer activity associated with television programs;

generating a report, based on the viewing behavior information for a viewer group defined by a viewer selection of individuals from a database, that specifies the number of viewers in the group who have engaged in a viewing activity associated with particular television programs at the televisions; and wherein the report is used to modify a display of an electronic program guide that identifies television programs which are being broadcast for display by one or more of the televisions and wherein the electronic program guide groups the television programs based on time at which each of the television programs is being broadcast, and wherein the modification of the electronic program guide includes modifying the display of the electronic program guide in such a manner as to display a list of the television programs in a list that is sorted by decreasing order of viewership, based on the audience in the viewer group that is currently tuned to each of the television programs which are being broadcast for display by one or more of the televisions, and such that a television program that is determined to be currently viewed by more viewers is listed in the list above one or more television programs that are determined to be currently viewed by fewer viewers, and wherein the electronic program guide display is further modified to include, for each television program included in the list, a numeric value that identifies a relative ranking of the television program, relative to other listed television programs, as well as a numeric percentage that identifies a relative percentage of viewers currently viewing the television program as compared to the other listed television programs, and wherein the electronic program guide displays television programs in at least three column groupings that each represent consecutive time blocks, and wherein only the first of the at least three column groupings, which represents a current time of displayed television programs, is modified by the report and such that only the first of the at least three column listings sorts the displayed television programming in a sorted order of viewership, based on the audience in the viewer group that is currently tuned to each of the television programs identified by the electronic program guide.

25. A physical storage media encoded with computer-executable instructions for implementing a method, in a processing device that is associated with a television and is included in a system in which viewing behavior information is gathered, for displaying information relating to viewership of currently-broadcasted television programs, wherein the method includes:

receiving a viewing behavior information report that includes information specifying the number of viewers in a viewer group defined by a viewer selection of individuals from a database who are currently watching particular television programs;

based on the viewing behavior report, modifying electronic program guide data at the processing device to indicate the number of viewers who are currently watching the particular television programs; and displaying the modified electronic program guide on the television, wherein the electronic program guide groups television programs based on time at which each of the television programs is being broadcast, and wherein the modified electronic program guide identifies the particular television programs in a list that is sorted by decreasing order of viewership, based on the audience in the viewer group that is currently tuned to each of the television programs which are being broadcast for display by one or more of the televisions, and such that a television program that is determined to be currently viewed by more viewers is listed in the list above one or more television programs that are determined to be currently viewed by fewer viewers, and wherein the modified electronic program guide is further displayed in such a way that each television program listed in the list includes a numeric value that identifies a relative ranking of the television program, relative to other listed television programs, as well as a numeric percentage that identifies a relative percentage of viewers currently viewing the television program as compared to the other listed television programs, and wherein the electronic program guide displays television programs in at least three column groupings that each represent consecutive time blocks, and wherein only the first of the at least three column groupings, which represents a current time of displayed television programs, is modified by the report and such that only the first of the at least three column listings sorts the displayed television programming in a sorted order of viewership, based on the audience in the viewer group that is currently tuned to each of the television programs identified by the electronic program guide.

* * * * *